US007295535B2

United States Patent
Halivaara (10) Patent No.: US 7,295,535 B2
(45) Date of Patent: Nov. 13, 2007

(54) METHOD FOR SIGNAL ACQUISITION IN A WIRELESS TERMINAL AND WIRELESS TERMINAL

(75) Inventor: Ismo Halivaara, Tampere (FI)

(73) Assignee: Nokia Corporation, Espoo (FI)

( * ) Notice: Subject to any disclaimer, the term of this patent is extended or adjusted under 35 U.S.C. 154(b) by 1086 days.

(21) Appl. No.: 10/294,432

(22) Filed: Nov. 13, 2002

(65) Prior Publication Data

US 2003/0091009 A1    May 15, 2003

(30) Foreign Application Priority Data

Nov. 13, 2001    (FI)  .................................. 20012199

(51) Int. Cl.
*H04Q 7/20* (2006.01)
(52) U.S. Cl. ...................... 370/329; 370/328; 370/330
(58) Field of Classification Search ................ 370/310, 370/328, 329, 335, 331, 342, 203, 208, 209, 370/431, 441, 320, 465, 468, 330; 455/67.11, 455/403, 422.1, 550.1, 561; 375/130, 150
See application file for complete search history.

(56) References Cited

U.S. PATENT DOCUMENTS

| | | | | |
|---|---|---|---|---|
| 6,263,010 B1 * | 7/2001 | Naruse et al. | .............. | 375/130 |
| 6,741,578 B1 * | 5/2004 | Moon et al. | ................. | 370/335 |
| 6,967,936 B1 * | 11/2005 | Laroia et al. | ............... | 370/329 |
| 7,068,987 B2 * | 6/2006 | Baldwin et al. | ......... | 455/232.1 |
| 7,130,284 B2 * | 10/2006 | Lee et al. | .................... | 370/331 |
| 2001/0006515 A1 * | 7/2001 | Lee et al. | .................... | 370/331 |
| 2003/0043766 A1 * | 3/2003 | McDonough et al. | ....... | 370/335 |
| 2003/0045299 A1 * | 3/2003 | New | .......................... | 455/455 |

FOREIGN PATENT DOCUMENTS

| | | |
|---|---|---|
| WO | 9911086 | 3/1999 |
| WO | 9941854 | 8/1999 |
| WO | 9957932 | 11/1999 |
| WO | 101596 | 1/2001 |

* cited by examiner

*Primary Examiner*—Jean Gelin (57) ABSTRACT

The invention relates to a method for acquisition of a signal in a wireless terminal receiving a modulated signal transmitted by at least one base station. In the wireless terminal, timing information of the signal from at least two different base stations is used for the acquisition of the signal of at least one of said base stations. The invention also relates to a system, in which the method is applied, as well as to a wireless terminal.

21 Claims, 4 Drawing Sheets

METHOD FOR SIGNAL ACQUISITION IN A WIRELESS TERMINAL AND WIRELESS TERMINAL

FIELD OF THE INVENTION

The present invention relates to a method for signal acquisition in a wireless terminal receiving a modulated signal transmitted by at least one base station. The invention also relates to a system with means for receiving a modulated signal transmitted by at least one base station, and means for acquisition of the signal transmitted by the base station. Furthermore, the invention relates to a wireless terminal, which comprises means for receiving a modulated signal transmitted by at least one base station, and means for acquisition of the signal transmitted by the base station.

BACKGROUND OF THE INVENTION

Positioning systems have been developed which are based on cellular mobile communication networks and in which a wireless terminal uses base station signal propagation times (differences in the time of arrival) for their positioning. In such OTDOA systems (observed time difference of arrival), the executability and precision of positioning are affected, among other things, by the number of base stations transmitting a signal whose propagation times the wireless terminal is capable of measuring. For the positioning, at least three different base stations are required to transmit a signal whose propagation time from the base station to the wireless terminal is known. However, the signal from some base stations may be too weak for the wireless terminal to take measurements with a sufficient reliability. Furthermore, in mobile communication systems based on the CDMA (code division multiple access) technique, each base station transmits at the same frequency. Thus, the signal of the serving base station may be so strong that it makes it more difficult to receive the signals of other base stations. In such a case, positioning may be even impossible. The serving base station refers to the base station, through which the wireless terminal communicates with the mobile communication network at a given time.

In so-called third generation mobile communication systems based on the spread spectrum technique, the base stations transmit a spread spectrum modulated signal, utilizing one or more spreading codes in the modulation. These systems apply the code division multiple access technique which makes it possible for several wireless terminals to communicate with the mobile communication network simultaneously. For such a system, the abbreviation CDMA is used, or WCDMA in the case of a wideband spread spectrum system. The base stations of the mobile communication system may be either synchronized, wherein the transmissions of the base stations are synchronized with each other, or non-synchronized, wherein each base station schedules its transmissions substantially independently of other base stations.

The signal transmitted from the base station can also propagate otherwise than along the line of sight, particularly when there are obstacles affecting the propagation of the signal and/or objects reflecting the signal between the base station and the wireless terminal. In particular, ground topography and buildings may cause attenuation and reflections in the signal. The same signal can thus come to the receiver along more than one route, which is called multipath propagation. In multipath propagation, the signals do not necessary travel along the same path, wherein the signal travelling along different paths comes to the receiver at different times, causing more than one correlation peak in the correlator of the receiver. Furthermore, the signal travelled along the line of sight may be attenuated so much that it is not detected by the receiver at all. Thus, the first correlation peak does not correspond to the shortest possible distance but the path travelled by a signal of multipath propagation. The incorrect distance data will cause positioning errors in systems which apply the time of flight of the signal transmitted from base stations to the wireless terminal and the known position of the base station, for positioning of the wireless terminal.

To receive the signal transmitted by the base station, the wireless terminal must perform acquisition to this signal. This can be implemented, for example, in such a way that the base station regularly transmits a primary/secondary synchronization code which is known to the receiver of the wireless terminal. Thus, the receiver of the wireless terminal determines, for example on the basis of cross-correlation, the code phase of the transmission and, on the basis of this code phase data, adjusts its own receiver to the correct phase and starts to receive the signal. On the other hand, it is possible to transmit, substantially continuously, a synchronizing signal on a given channel (so-called pilot channel), which signal is modulated by a scrambling code. This scrambling code has a constant length and is repeated at regular intervals. The receiver can try to determine the code phase of this scrambling code and then perform acquisition.

In a prior art solution, the channel coding applies a so-called primary synchronization code whose length is 256 chips, as well as a secondary synchronization code whose length is also 256 chips. Each base station transmits the same primary synchronization code. The secondary synchronization code is preferably formed by selecting, from a given number of synchronization codes, a set of synchronization codes in a given sequence, wherein this sequence of synchronization codes forms a kind of a code word. For example, there are 16 synchronization codes and these synchronization codes are sequenced e.g. in the order of 1st, 5th, 3rd, 16th, 15th, 2nd, etc., to a code with a given length (e.g. 256 chips). The sequence of the selected codes can vary at different base stations. The channel coding is then followed by modulation with the scrambling code. This code is selected from a given number (e.g. eight) of scrambling codes in such a way that a given set of scrambling codes corresponds to a given code word of the secondary synchronization code. For example, on the pilot channel of the UMTS system, it is possible to use a total of 512 different codes. These codes are divided into 64 different sets of 8 codes each. The code word formed by the secondary synchronization codes indicates which of these 64 sets is in question. Within the set, the correct code can be found, for example, by trying all the eight ones in turn or in parallel and by selecting the code which best correlates with the received signal. Thus, on the basis of this scrambling code, it is possible to differentiate one base station from another. When transmission diversity is applied, the same base station can use a different scrambling code in each transmission sector, wherein one sector of the same base station can be differentiated from another in a corresponding way. In this system, the code phase is determined on the basis of the scrambling code. In such an arrangement, it is not easy to find weak signals, because the correlation length is limited by the length of the synchronization code which is only 256 bits.

An alternative presented in a prior art solution to eliminate the problem of the short code is to perform the synchronization on the pilot channel. In this solution, the pilot channel applies a code which consists of 38,400 chips and which is repeated at intervals of about 10 ms. The interval of the chips is about 260 ns. It is thus possible to achieve a processing gain of about 24 dB. A problem here is, for example, the fact that if the base stations are not synchronized with each other, the receiver of the wireless terminal does not have information about the correct code phase. In this case, the receiver of the wireless terminal must find out the correct code phase from a total of 38,400 different alternatives. In the worst case, this means scanning of all the code phases. This will consume a lot of power and take as long as about 1.5 s for each receiving channel. Furthermore, incorrect correlation peaks may cause an incorrect code phase interpretation which will lead to incorrect positioning.

International patent application WO 99/11086 presents a positioning system which determines the relative time differences (RTD) of signals from base stations in a reference mobile station. The positions of the reference mobile station and the base stations are known. In the user's mobile station, whose position is to be determined, the observed time differences (OTD) of transmissions from the respective base stations are recorded, wherein by comparing the time differences of transmissions from the base stations, measured by the reference mobile station and by the user's mobile station, it is possible to find out the position of the user's mobile station by utilizing the known position data. However, this system does not present means to improve the reception of a weak signal, wherein only such base stations can be used for positioning, whose signal is sufficiently strong both in the reference mobile station and in the user's mobile station. Furthermore, the system requires the use of a reference mobile station.

SUMMARY OF THE INVENTION

It is an aim of the present invention to provide an improved method for the acquisition of also weak signals, as well as a wireless terminal in which acquisition of weak signals is also possible. The invention is based on the idea that auxiliary information is transmitted via the mobile communication network to the wireless terminal, on the basis of which information it is possible to narrow the code phase search window and thereby to better find also a weak base station signal. To put it more precisely, the method according to the present invention is primarily characterized in that the wireless terminal applies information about the timing of signals from at least two base stations, for acquisition of the signal from at least one of said base stations. The system according to the invention is primarily characterized in that the system comprises means for applying information about the timing of signals from at least two base stations, for acquisition of the signal from at least one of said base stations. The wireless terminal according to the invention is primarily characterized in that it comprises means for determining the correlation between the signal of the base station and the reference code corresponding to the code used in the modulation of the signal, means for adjusting the code phase of the reference signal, and means for using said timing information in the adjustment of the code phase.

The present invention shows remarkable advantages over solutions of prior art. The method according to the invention can also be used to receive signals of such base stations, whose signal strength in the wireless terminal is significantly lower than the signal strength of the serving base station. Thus, in the wireless terminal, it is possible to perform flight time measurements for signals from several base stations and also for signals from base stations located further away, which improves the precision of the positioning. Furthermore, the positioning can be performed in a more reliable way than when using solutions of prior art, because it is more likely that the wireless terminal can receive a number of signals from base stations which is sufficient for positioning.

BRIEF DESCRIPTION OF THE DRAWINGS

In the following, the invention will be described in more detail with reference to the appended drawings, in which FIG. 3 shows the structure of the receiver of the wireless terminal according to FIG. 2 in a simplified block diagram, and.

DETAILED DESCRIPTION OF THE INVENTION

Figure 1:
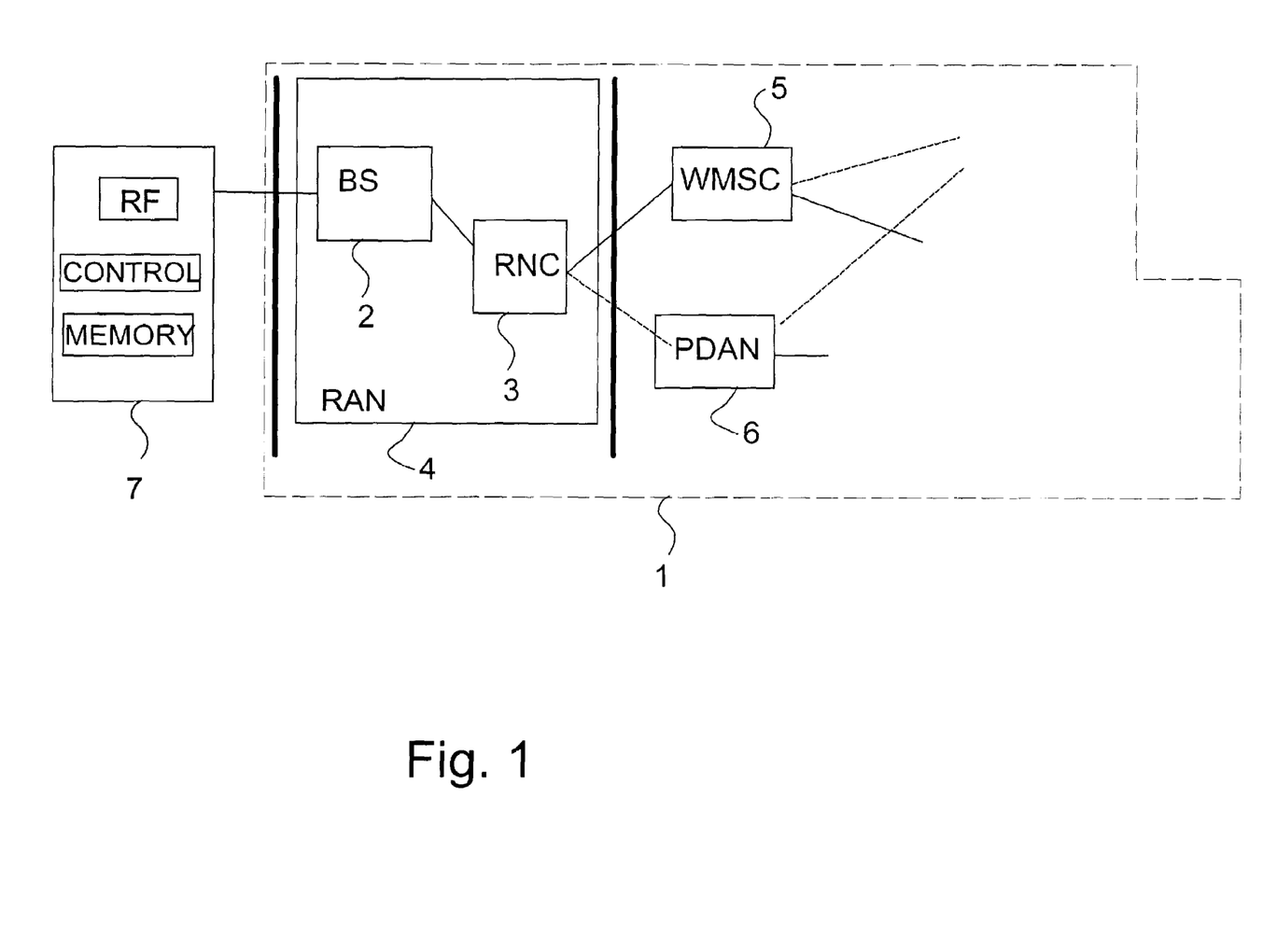
FIG. 1 shows a system according to a preferred embodiment of the invention in a simplified block diagram.

In the following description of an advantageous embodiment of the invention, the UMTS mobile communication system, based on WCDMA technique, will be used as an example of a mobile communication system 1, but it will be obvious that the invention can also be applied in other systems which apply code modulation. The mobile communication system 1 comprises a radio access node (RAN) 4. which comprises a base station (BS) 2 and a radio network controller (RNC) 3 which controls the base station 2 and routes the connections between the base station 2 and the rest of the system, a wireless mobile switching centre (WMSC) 5, and a packet data access node (PDAN) 5 as routing possibilities in addition to the radio network controller 3. In the system shown in FIG. 1, the UMTS mobile communication network is only shown in part, because it is the base stations 2*a*-2*d* of the mobile communication network 1 which are of primary significance in the present invention.

Figure 2:
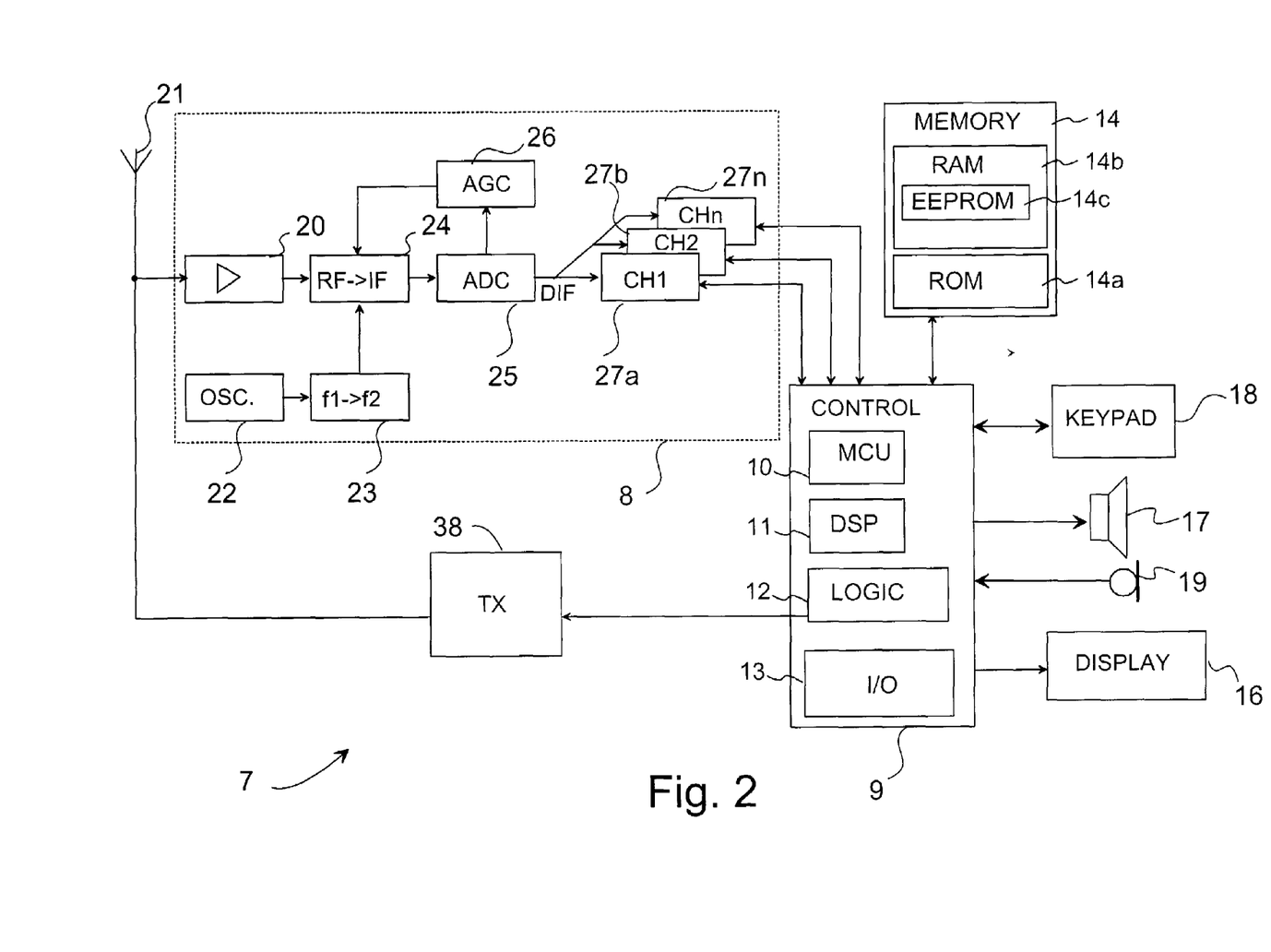
FIG. 2 shows a wireless terminal according to a preferred embodiment of the invention in a simplified block diagram.

FIG. 2 shows the structure of a wireless terminal 7 according to a preferred embodiment of the invention, in a simplified block diagram. The wireless terminal 7 comprises a receiver 8 and a transmitter 38 for communication with the mobile communication system 1. A control block 9 is intended to control the operation of the wireless terminal 7. The control block 9 preferably comprises at least one processor 10 as well as a digital signal processing unit 11. The control block also comprises logic functions 12 as well as access logic 13 (Input/Output, IO), e.g. for communication between other functional units and the processor 10. Furthermore, the wireless terminal 7 comprises a memory 14 which preferably contains at least a read-only memory (ROM) 14*a* and a random access memory (PAM) 14*b*. The read-only memory 14*a* can also be, either completely or in part, implemented by means of a non-volatile random-access memory, such as EEPROM or FLASH. The read-only memory 14*a* is intended for the storage of e.g. control software, ampliation software, permanent data and the like in the wireless terminal. The random access memory 14*b* can be used, for example, for the storage of changeable information required during the use of the wireless terminal 7. In this advantageous embodiment, a part of the random access memory is implemented by using a non-volatile random access memory 14c, wherein it is possible to store in this memory, for example, information which does not need to be changed often, e.g. user profile data, telephone directory data, calendar data, etc. The user interface 15 of the wireless terminal 7 comprises means for presenting data, such as a display 16 and a earpiece/speaker 17, as well as means for entering data, such as one or more keypads 18 and a microphone 19.

Figure 3:
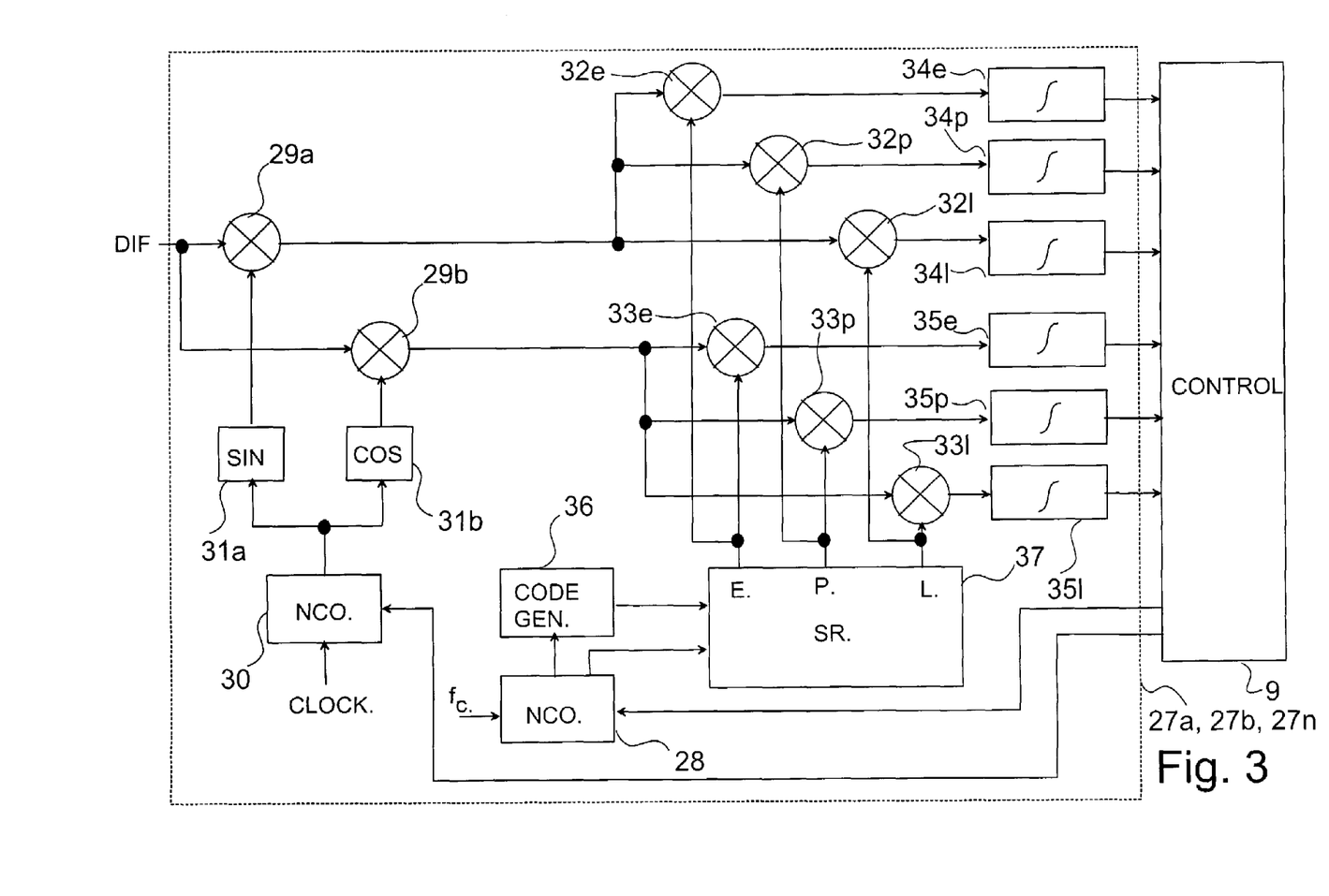

Next, we shall still briefly discuss the operation of the receiver 8 of the wireless terminal 7 shown in FIG. 2, with reference to the simplified block diagram of FIG. 3. The repetition-coded signal to be received via an antenna 21 is amplified in a high-frequency amplifier 20 and modified by means of a clock signal generated by a clock generator 22 and a frequency synthesizer 23 preferably to an intermediate frequency or directly to a baseband in a modifying block 24. At this stage, the signal is preferably still in analog format, wherein it is converted to a digital signal in an analog-to-digital converter 25. The analog-to-digital converter 25 provides not only a digital receiving signal but also a control to an automatic gain control (AGC) block 26 to level out variations in strength of the received signal in a way known as such. The digital signal converted to an intermediate frequency or the baseband is led to one or more digital monitoring blocks 27a, 26b, 27n to convert the digital signal to two signals with different phases (I/Q) and multiplication with a reference code. The signals formed in the monitoring blocks 27a, 27b, 27n are further transferred to the control block 9 where the aim is to determine the code phase and frequency shift of the received signal. The control block 9 forms a back coupling in the monitoring blocks 27a, 27b, 27n to adjust the code phase of the reference code and a first numerically controlled oscillator 28 (FIG. 3), if necessary. After the code phase and the frequency shift have been determined, that is, the receiver has tracked the signal to be received, it is possible to start demodulation and storage of the navigation information transmitted in the signal, if necessary. The control block 9 preferably stores navigation information in the memory 14.

An advantageous structure for the digital monitoring blocks 27a, 27b, 27n is shown in the block diagram of FIG. 3. The digital signal converted to an intermediate frequency or the baseband is mixed in mixers 29a, 29b with the signal generated by a numerically controlled oscillator 30 in such a way that there is a phase difference of about 90° between theoscillator signal from phase shift block 31a to be input in the first mixer 29a and the oscillator signal from phase shift block 31b to be input in the second mixer 29b. Thus, the mixing result is a signal comprising two components in a way known as such: the I and Q components. In the formation of the phase difference, phase shift blocks 31a, 31b are preferably used. Next, the I and Q components are subjected to multiplication with the reference code in code multipliers 32e, 33e, 32p, 33p; 32l, 33l. The reference code is led in different phases to the code multipliers 32e, 33e; 32p, 33p, 32l, 33l preferably so that three or more reference signals with different phases are formed of both the I component and the Q component. These reference signals are preferably e.g. integrated in integration blocks 34e, 35e; 34p, 35p; 34l, 35l. From the integration blocks 34e, 35e; 34p, 35p; 34l, 35l, the integrated signals are led to the control block 9, where, on the basis of the output signals of the different integration blocks, it is deduced e.g. whether the code phase of the reference code is leading (E, early), behind (L, late) or in the same phase (P, prompt) as the code phase of the received signal. On the basis of this deduction, the control block 9 will adjust the frequency of the first numerically controlled oscillator 28 controlling the reference code generator 36. Furthermore, reference code signals with different phases are formed of the reference code generated by the reference code generators 36 in a phase shift block 37. Moreover, the control block 9 determines the frequency shift, if any, and adjusts the frequency of the second numerically controlled oscillator 30, if necessary. In each monitoring block, signal processing can be performed for one signal at a time, wherein to receive e.g. four signal simultaneously, there must be at least four monitoring blocks. It is obvious that the receiver shown in FIGS. 2 and 3 is only an example implementation, but the present invention is not limited for use in this receiver only. Each digital monitoring block 27a, 27b, 27n can be implemented as a so-called RAKE receiver, which comprises two or more receiver branches, i.e. so-called fingers. Each receiver branch can be adjusted to receive components of the same signal which have propagated along different paths in such a way that the differences in the propagation times are compensated and the compensated signals are summed up.

Figure 4:
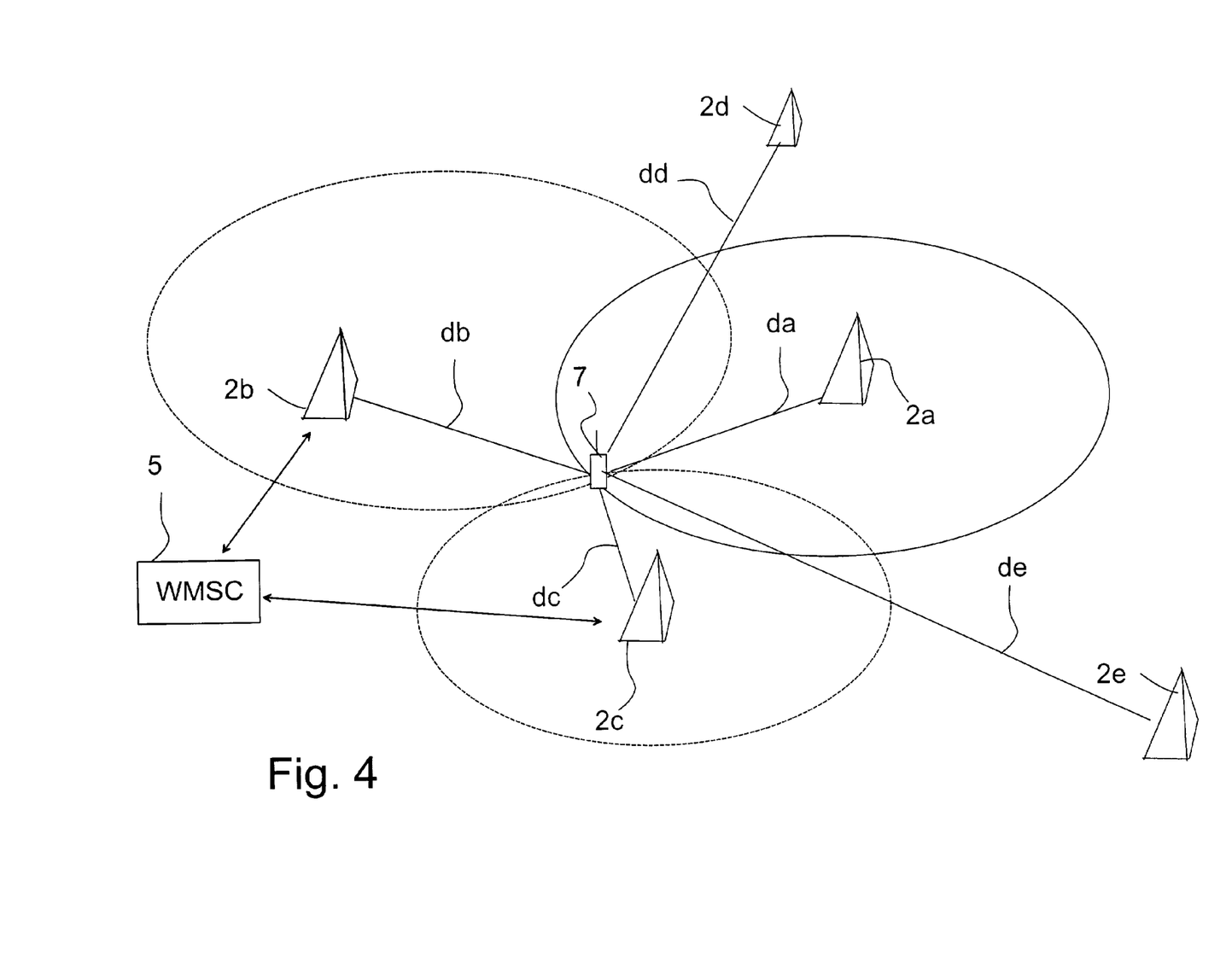
FIG. 4 shows an example situation, in which the position of a wireless terminal is determined by the method according to an advantageous embodiment of the invention, by means of base stations.

The following is a description of the operation of the method according to a preferred embodiment of the invention by using the situation of FIG. 4 as an example. FIG. 4 shows base stations 2a-2e and a wireless terminal 7 whose position is determined on the basis of the signals transmitted by the base stations 2a-2e. Furthermore, in FIG. 4, distances between the wireless station and the base stations 2a-2e are indicated with the references da, db, dc, dd, and de, respectively. However, these distances are normally not precisely known during positioning. The base stations 2a-2e communicate with the mobile switching centre 5 in a way known as such. For clarity, FIG. 4 only illustrates the connections of the second base station 2b and the third base station 2c to the mobile switching centre 5. Furthermore, no radio network controllers 3 are illustrated in FIG. 4, but it is obvious that the operation of each base station is controlled by one radio network controller 3. The same radio network controller may control more than one base stations 2a-2e, but this fact is not significant for the present invention. It is assumed that the serving base station is the third base station 2c which, in this example situation, is closest to the mobile terminal 7, but the serving base station can also be another base station. The neighbouring base stations (neighbouring cells) of this base station are the base stations 2a, 2b, 2e. The serving base station 2c transmits information about the neighbouring base stations to the wireless terminal 7, e.g. for possible change of cell.

On the basis of the position of the serving base station 2c, the mobile communication system 1 knows, at some precision, where the mobile terminal 7 is positioned. Thus, in the mobile communication system 1, the relative time differences RTD, which are possibly detected between the transmissions on the pilot channel of some neighbouring base stations 2a, 2b, 2e of the serving base station 2c, are measured in relation to the timing of the transmission of the serving base station 2c. These time differences indicate how large a phase difference the chips of the signal on the pilot channel have between different base stations 2a-2e. This information is transmitted to the wireless terminal. However, in the case of a mobile communication system in which the transmissions of the base stations 2a-2e are synchronized with each other, there is no need to make such a measurement, but the timing data can be transmitted directly to the wireless terminal 7.

In a system according to a preferred embodiment of the invention, the transmitted timing data can also be the data of such a base station which is not a neighbouring base station of the serving base station but a neighbouring base station of a neighbouring base station. For example, in the situation of FIG. 4, the base station 2d is not the neighbouring base station of the serving base station 2c, but it is a neighbouring base station of the base station 2a.

After this timing data has been received in the wireless terminal 7, the wireless terminal 7 can start the acquisition of a signal of one or more such base stations 2a, 2b, 2d, which is not the serving base station. On the basis of the timing data, the phase of the code generator 36 is adjusted so that the reference code formed by the code generator is, as precisely as possible, in the same phase with the code of the pilot channel of that base station 2a, 2b, 2d, 2e, with which synchronization is attempted. This time difference can be determined at a relatively good precision on the basis of the code phase of the pilot channel of the serving base station and the code phase difference RTD measured by the mobile communication system 1. In this context, it is assumed that there is an upper limit for the distance between the base stations (for the cell size). This upper limit can thus be used as an upper limit for the signal propagation time from the base station to be searched to the wireless terminal. For example, when the cell size is in the order of 20 km, the uncertainty of the timing can be reduced to as few as 256 chips (1 chip~78 m). The reference code selected is the scrambling code used by the base station of whose signal acquisition is attempted. After this, the receiver 8 of the wireless terminal preferably attempts acquisition of the signal of this pilot channel by examining the correlation peaks advantageously in the following way. From the integration blocks 34e, 35e; 34p, 35p; 34l, 35l, the integrated signals are transferred to the control block 9 where, on the basis of the output signals of the different integration blocks, it is deduced e.g. whether the code phase of the reference code is leading, behind or in the same phase as the code phase of the received signal. If necessary, the phase of the code generator 36 is adjusted and a new check-up is made. This is iterated until the correct code phase is known at a sufficient precision. Next, this phase difference can be used to determine the distance to said base station at a better precision. The above-presented steps are iterated, if necessary, for different base stations 2a-2e, until acquisition has been performed for a sufficient number of base stations 2a-2e.

In a situation of attempting to synchronize the receiver 8 of the wireless terminal with another base station than a neighbouring base station of the serving base station 2c, it is possible to use a multiple of the above-mentioned cell size as the default propagation time.

However, the position of the wireless station 7 is not necessarily known in the mobile communication system 1 at such a precision that said phase difference measurements would give a sufficiently precise estimate for the acquisition. Thus, the mobile communication system 1 can transmit information about the position of the base stations 2a-2e (the coordinates of the base stations) to the wireless terminal 7. Thus, this coordinate information can be used in the wireless terminal 7 e.g. for a more precise estimation of the signal propagation times from the base station to the wireless terminal 7, by using, as the default for the position of the wireless terminal, for example the position of the serving base station or another position, such as a previously determined position of the wireless terminal. In this way, the acquisition precision can be further improved on the basis of the propagation time information and the phase difference information.

The mobile communication system 1 can also transmit to the wireless terminal 7 information about how far each base station 2a-2e is estimated to be from the wireless terminal. This information is preferably the time taken for the to-and-fro travel between the base station 2a-2e and the wireless terminal 7, i.e. the so-called round trip time (RTT). In this case, the mobile communication system 1 has a kind of a default position for the wireless terminal 7, or the propagation time data are based on measurements of the propagation times made by different base stations 2a-2e, in which the wireless terminal 7 transmits the signal transmitted by the base station 2a-2e back to said base station 2a-2e. By means of these propagation time measurements, the wireless terminal 7 can estimate distances to such base stations 2a-2e, whose signal the wireless terminal is capable of receiving. On the basis of the propagation time measurements and possible base station coordinates, the wireless terminal can determine an estimate for its own position. To focus the position, the wireless terminal 7 may try to receive the signal of yet another or several other base stations. In this case, it is also possible to transmit to the wireless terminal, preferably via the serving base station, the timing data RTD about the code phase of such a base station or base stations, whose signals the wireless terminal 7 has not been capable of acquiring. The wireless terminal 7 can use the position estimate calculated by it, for example, to estimate the propagation time of the signal from the serving base station 2c to the wireless terminal 7. By combining this information with the maximum cell size or the coordinates of the base station to be searched, as well as the code phase timing data RTD, the wireless terminal can estimate the code phase of the signal of the base station to be searched in a relatively precise way and to perform correlation by using a relatively long reference code. Thus, the precision of correlation can be improved and acquisition can be performed to weaker signals faster than what is possible in solutions of prior art.

In some mobile communication systems 1, the base stations 2a-2e can apply so-called transmission diversity in such a way that the cell formed by the base station consists of sectors. Thus, the base station normally comprises several directional antennas which are fixed in different directions from the base station 2a-2e and whereby different information can be transmitted via each antenna. Thus, one possibility for improving the precision of timing is that the mobile communication system 1 transmits to the wireless terminal 7 information about the sector in whose direction the wireless terminal 7 is positioned in relation to said base station 2a-2e.

Utilizing the above-presented information, the wireless terminal 7 can significantly improve the precision and speed of acquisition, because the correlation length can be increased without a need to search for the code phase with all possible values of the code phase. Consequently, the time window to be used in the search of the correct code phase can be narrowed more than when using solutions of prior art. Thus, acquisition of weaker signals is also possible. Moreover, possible cross-correlation results caused by other signals than the signal of the base station to be received can be better eliminated. In a preferred embodiment, an estimate which is, at a maximum, in the order of 10 to 200 chips off the correct phase difference can be achieved for the phase difference.

By the method of the invention, it is also possible to significantly reduce inaccuracies caused by incorrect correlation peaks, because it is possible to eliminate in the receiver 8 such correlation peaks which have been formed by a multipath-propagated signal. Also, the fact that a possibly weaker correlation peak of a signal with a line of sight is detected in a more reliable way, reduces the probability that the correlation peak of a multipath propagated signal is interpreted as a correlation peak caused by a signal propagated along the line of sight.

After the acquisition of a signal from a sufficient number of base stations 2a-2e in the receiver 8 of the wireless terminal, it is possible to perform a more precise positioning by using methods known as such. Typically, at least three different base stations will be needed, but to improve the precision, or if the position of said three base stations is unfavourable for the precision of the positioning, more base stations can be used. For the positioning, the favourable position of the base stations 2a-2e in relation to the wireless terminal 7 is such that the base stations are in as different directions as possible, seen from the wireless terminal 7. Thus, if the wireless terminal 7 is capable of receiving, for example, the signal of the serving base station 2c and the signal of one of its neighbouring base stations 2b, it would be, for the precision of the positioning in the situation of FIG. 4, advantageous to attempt to acquire the signal of the base station 2a or that of the base station 2d.

Although it has been presented above that the acquisition of the signal of the pilot channel is performed, the invention is not limited to such an application only, but in different mobile communication systems 1, it is possible to use another such signal in the system, by means of which acquisition is performed. One example to be mentioned is training sequences used in the GSM system.

In connection with a synchronic mobile communication system 1, the transmission code phase difference between the base stations 2a-2e is substantially the same. This code phase difference can also be zero, i.e. all such base stations transmit the same signal substantially simultaneously. In the synchronic mobile communication system, it is not necessary to transmit information about the code phase difference to the wireless terminal 7, but the code phase data may have been stored in the memory 14 of the wireless terminal 7 e.g. in connection with the manufacture, or the code phase data can be transmitted to the wireless terminal 7 for example with a mobile subscriber card (Subscriber Identity Module SIM, or UMTS Subscriber Identity Module USIM, not presented), or in another suitable way.

Although the invention has been described above in an application in which base station signals are used for the positioning, it is obvious that the method of the invention can also be used in other applications to improve the acquisition of the signal of the base station by using at least said code phase timing data RTD.

It should be realized that the present invention is not limited solely to the above-presented embodiments, but it can be modified within the scope of the appended claims.

The invention claimed is:

1. A method, comprising:
  receiving timing data of at least two base stations in a wireless terminal, and
  performing acquisition of a modulated signal in said wireless terminal transmitted by at least one base station of said at least two base stations by using said timing data of said at least two base stations for performing said acquisition of the modulated signal in said terminal, wherein said timing data comprises a relative time difference between signals from said at least two base stations at a time of transmission.

2. The method according to claim 1, wherein in the acquisition of the modulated signal of the at least one base station, a correlation is made between the modulated signal of the at least one base station and a reference code corresponding to the code used in the modulation of the signal, wherein for the acquisition, a code phase of the reference code is adjusted, and wherein said timing data is used in the adjustment of the code phase.

3. The method according to claim 1, wherein said timing data from said at least two base stations comprises at least one of the following: data about signal propagation time between the base station and the wireless terminal, data about positions of said at least two base stations.

4. The method according to claim 1, wherein acquisition of signals from at least three different base stations is performed, and wherein code phases determined during the acquisition of the signals from said at least three different base stations are used in positioning of the wireless terminal.

5. The method according to claim 2, wherein for distances of the base stations from the wireless terminal, a maximum distance is selected as a default value, and wherein said maximum distance is used in the adjustment of the code phase of said reference signal.

6. The method according to claim 1, wherein as said at least one base station, a base station serving the wireless terminal is used, wherein the wireless terminal receives the modulated signal of the serving base station, and wherein said timing data is related to neighboring base stations of said serving base station and is transmitted to the wireless terminal from said serving base station.

7. The method according to claim 6, wherein said timing data transmitted to the wireless terminal is about at least one neighbouring base station which does not neighbor said serving base station but which is a neighbor of at least one base station that does neighbor said serving base station.

8. The method according to claim 1, wherein the modulated signal transmitted by the at least one base station of the at least two base stations are spread spectrum modulated signals.

9. The method according to claim 1, wherein the base stations are base stations of the UMTS mobile communication system, and that acquisition of the signal of a pilot channel is performed.

10. The method according to claim 2, wherein for the acquisition, at least the following steps are taken in the wireless terminal: acquisition of a modulated signal of a first base station, using said timing data of signals from at least two base stations to determine a transmission time difference between said first base station and a second base station, determining an estimate for a signal propagation time difference between said first base station and the wireless terminal and between said second base station and the wireless terminal, adjusting a code phase of a reference code based on said transmission time difference and said propagation time difference, and performing a correlation between a received signal and the reference code for acquisition of a modulated signal of the second base station.

11. A system comprising base stations and a wireless terminal with an antenna for receiving a modulated signal transmitted by at least one base station and a receiver for acquisition of the signal transmitted by the base station, wherein timing data of signals from at least two base stations is used for said acquisition of the modulated signal wherein said timing data comprises a relative time difference between signals from said at least two base stations at a time of transmission.

12. The system according to claim 11 comprising a control for making a correlation between the modulated signal transmitted by the base station and a reference code signal corresponding to a code used in modulation of the signal, and for adjusting a code phase of the reference code signal, and for using said timing data in the adjustment of the code phase.

13. The system according to claim 11, wherein said timing data of the signals from at least two different base stations comprises at least one of the following: data about a signal propagation time between a base station and the wireless terminal, data about the positions of said at least two base stations.

14. The system according to claim 11, wherein code phases are determined during acquisition of signals from at least three different base stations for positioning of the wireless terminal.

15. The system according to claim 11, wherein the antenna of the wireless terminal is for receiving a signal of a serving base station, and that the system comprises a transmitter for transmitting data related to neighboring base stations of said serving base station to the wireless terminal.

16. The system according to claim 11, wherein the base stations are base stations of a UMTS mobile communication system, and said acquisition is of a signal of a pilot channel.

17. A wireless terminal comprising
an antenna for receiving timing data of at least two base stations transmitted by a base station and
a receiver for acquisition of a modulated signal transmitted by at least one base station and for using the timing data of the at least two base stations for acquisition of a signal of at least one of said base stations wherein said timing data of at least two base stations comprises a relative time difference between signals transmitted from said at least two base stations at a time of transmission.

18. The wireless terminal according to claim 17 said receiver comprising a control for making a correlation between the signal of the base station and a reference signal corresponding to a code used in modulation of the modulated signal, and for adjusting a code phase of the reference signal, and for using said timing data in the adjustment of the code phase.

19. The wireless terminal according to claim 17, wherein said timing data of at least two base stations comprises at least one of the following: data about the signal propagation time between the base station and the wireless terminal, data about positions of said at least two base stations.

20. The wireless terminal according to claim 17, said receiver for acquiring a signal transmitted from at least three different base stations, and for using code phases determined during the acquisition of the signal from said at least three different base stations in positioning of the wireless terminal.

21. The wireless terminal according to claim 17, comprising a UMTS mobile communication device.

* * * * *